US007694276B2

(12) United States Patent
Larus et al.

(10) Patent No.: US 7,694,276 B2
(45) Date of Patent: Apr. 6, 2010

(54) CONTRACTS AND FUTURES IN AN ASYNCHRONOUS PROGRAMMING LANGUAGE

(75) Inventors: James R. Larus, Mercer Island, WA (US); Sriram K. Rajamani, Bellevue, WA (US); Jakob Rehof, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1792 days.

(21) Appl. No.: 10/659,221

(22) Filed: Sep. 10, 2003

(65) Prior Publication Data

US 2004/0172638 A1    Sep. 2, 2004

Related U.S. Application Data

(60) Provisional application No. 60/450,982, filed on Feb. 28, 2003.

(51) Int. Cl.
*G06F 9/44* (2006.01)

(52) U.S. Cl. .................. 717/116; 717/104; 717/120; 717/121; 709/204; 709/205

(58) Field of Classification Search .......... 717/104, 717/114–120; 709/204–207
See application file for complete search history.

(56) References Cited

U.S. PATENT DOCUMENTS

| 6,058,416 | A | * | 5/2000 | Mukherjee et al. ....... 709/203 |
| 6,195,685 | B1 | * | 2/2001 | Mukherjee et al. ....... 709/205 |
| 6,237,134 | B1 | | 5/2001 | Sundaresan |
| 6,850,979 | B1 | * | 2/2005 | Saulpaugh et al. ....... 709/225 |
| 2003/0041288 | A1 | * | 2/2003 | Kolawa et al. ............ 714/38 |
| 2003/0204570 | A1 | * | 10/2003 | Rehof et al. ............. 709/207 |

OTHER PUBLICATIONS

Beugnard, et al., "Making Components Contract Aware", IEEE, Computer, 1999, p. 38-44.*
Holland, Ian M., "Specifying reusable components using Contracts", ECOOP, 1992, pp. 287-308.*
Jezequel, et al., "Design by Contract: The Lessons of Ariane", Computer, vol. 30, Iss. 1, Jan. 1997, pp. 129-130.*
Le Sommer, et al., "A Contract-Based Approach of Resource-Constrained Software Deployment", CD 2002, LNCS 2370, 2002, pp. 15-30.*
Weis et al., "A UML Meta-model for Contract Aware Components", UML 2001, LNCS 2185, 2001, pp. 442-456.*
Torben Amtoft, Flemming Nielson, and Hanne Riis Nielson, Type and Effect Systems, 1999, 253 pages, Imperial College Press.
Thomas Ball and Sriram K. Rajamani, The SLAM Project: Debugging System Software via Static Analysis, Principles of Programming Languages, Jan. 16-18, 2002, 3 pages, ACM, Portland, OR, USA.

(Continued)

*Primary Examiner*—Wei Y Zhen
*Assistant Examiner*—Ryan D Coyer
(74) *Attorney, Agent, or Firm*—Lee & Hayes, PLLC

(57) ABSTRACT

An asynchronous programming language that facilitates concurrent programming by utilizing futures, asynchronous calls, and joins on futures. For each of a client interface and a service interface of an asynchronous interface, respective models are automatically extracted. A behavioral contract is defined on the asynchronous interface. The client and service models are then passed to modular checking algorithm that checks to ensure that both the client and the service conform to the behavioral contract. The checking algorithm combines region-based type systems with model checking techniques to handle pointer aliasing in a sound manner.

62 Claims, 6 Drawing Sheets

OTHER PUBLICATIONS

Nick Benton, Luca Cardelli, and Cedric Fournet, Modern Concurrency Abstractions for C#, Workshop on Foundations of Object-Oriented Languages, Sep. 2004, pp. 769-804, ACM Transactions on Programming Languages and Systems, vol. 26, No. 5.

Lars Birkedal, Mads Tofte, and Magnus Vejlstrup, From Region Inference to von Nuemann Machines via Region Representation Inference, Principles of Programming Languages, 1996, pp. 171-183, ACM, St. Petersburg, FLA, USA.

Sagar Chaki, Sriram K. Rajamani, and Jakob Rehof, Types as Models: Model Checking Message-Passing Programs, Principles of Programming Languages, Jan. 16-18, 2002, pp. 45-57, ACM, Portland, OR, USA.

Arindam Chakrabarti, Luca De Alfaro, Thomas A. Henzinger, Marcin Jurdzinski, and Freddy Y.C. Mang, Interface Compatibility Checking for Software Modules, Computer-Aided Verification, 2002, Springer-Verlag, 14 pages.

Young-Ri Choi, Amit Garg, Siddhartha Rai, Jayadev Misra, and Harrick Vin, Orchestrating Computations on the World-wide Web, Proceedings of the Euro-Par Conference on Parallel Processing. 2002, 20 pages.

Manuvir Das, Sorin Lerner, and Mark Seigle, ESP: Path-Sensitive Program Verification in Polynomial Time, Programming Language Design and Implementation, Jun. 17-19, 2002, ACM, Berlin, Germany, 12 pages.

Robert Deline and Manuel Fahndrich, Enforcing High-Level Protocols in Low-Level Software, Programming Language Design and Implementation, 2001, ACM, Snowbird, Utah, 11 pages.

EMCA Standard EMCA-334: C# Language Specification, http://www.ecma-international.org/publications/files/ECMA-ST/Ecma-334.pdf, Dec. 2001, 523 pages.

Cormac Flanagan, K. Rustan M. Leino, Mark Lillibridge, Greg Nelson, James B. Saxe, Raymie Stata, Extended Static Checking for Java, Programming Language Design and Implementation, Jun. 17-19, 2002, ACM, Berlin, Germany.

Cedric Fournet and Georges Gonthier, The Reflexive CHAM and the Join-Calculus, Principles of Programming Languages, 1996, pp. 372-385, ACM, St. Petersburg, FLA, USA.

Lance Hammond, Basem A. Nayfeh, and Kunle Olukotun, A Single-Chip Multiprocessor, Computer, Sep. 1997, pp. 79-85, vol. 30, No. 9, IEEE Computer Society.

John Hatcliff and Matthew Dwyer, Using the Bandera Tool Set to Model-check Properties of Concurrent Java Software, Concurrency Theory, 2001, pp. 39-58, Springer-Verlag.

C.A.R. Hoare, Communicating Sequential Processes, 1985, 238 Pages, Prentice Hall International.

Gerard J. Holzmann, The Model Checker Spin, IEEE Transactions on Software Engineering, May 1997, pp. 279-295, vol. 23, No. 5.

Robert H. Halstead, Jr., Multilisp: A Language for Concurrent Symbolic Computation, ACM Transactions on Programming Languages and Systems, Oct. 1985, pp. 501-538, vol. 7, No. 4.

Jack L. Lo, Susan J. Eggers, Joel S. Emer, Henry M. Levy, Rebecca L. Stamm, and Dean M. Tullsen, Converting Thread-Level Parallelism to Instruction-Level Parallelism via Simultaneous Multithreading, ACM Transactions on Computer Systems, Aug. 1997, pp. 322-354, vol. 15, No. 3.

Robin Milner, Communicating and Mobile Systems: the pi-calculus, 161 pages, 1999, Cambridge University Press.

Hanne Riis Nielson and Flemming Nielson, Higher-Order Concurrent Programs with Finite Communication Topology, Principles of Programming Languages, Jan. 1994, pp. 84-97, ACM, Portland, OR, USA.

Sriram K. Rajamani and Jakob Rehof, Conformance Checking for Models of Asynchronous Message Passing Software, Computer-Aided Verification, 2002, Springer-Verlag, 13 pages.

John H. Reppy, Concurrent Programming in ML, 1999, 308 pages, Cambridge University Press.

Mads Tofte and Jean-Pierre Talpin, Implementation of the Typed Call-by-Value lambda-calculus using a Stack of Regions, Principles of Programming Languages, Jan. 1994, pp. 188-201, ACM, Portland, OR, USA.

Mads Tofte and Jean-Pierre Talpin, Region-Based Memory Management, Information and Computation, 1997, pp. 109-176, vol. 132, No. 2.

Wilhelm Hasselbring, Programming Languages and Systems for Prototyping Concurrent Applications, ACM Computing Surveys, vol. 32, No. 1, Mar. 2000.

Denis Caromel, et al., Asynchronous and Deterministic Objects, Proceedings of the 31st ACM SIGPLAN-SIGACT, pp. 123-134, 2004.

Tiberiu Chelcea, et al., Resynthesis and Peephole Transformations for the Optimization of Large-Scale Asynchronous Systems, Proceedings of the 39th Conference on Design Automation, pp. 405-410, 2002.

* cited by examiner

CONTRACTS AND FUTURES IN AN ASYNCHRONOUS PROGRAMMING LANGUAGE

CROSS-REFERENCE TO RELATED APPLICATIONS

This application claims priority from pending U.S. Provisional Patent Application Ser. No. 60/450,982 entitled "CONTRACTS AND FUTURES IN AN ASYNCHRONOUS PROGRAMMING LANGUAGE" filed Feb. 28, 2003.

TECHNICAL FIELD

This invention is related to an alternative concurrent programming model in computers, and more specifically, a programming language for facilitating such asynchronous concurrent operations.

BACKGROUND OF THE INVENTION

Programming languages, for the most part, impose a synchronous view on an increasingly asynchronous world. In these languages, operations are totally ordered, so that, given a program's input data, the entire sequence of its computation is determined. However, for better or worse, computation is becoming increasingly asynchronous. At the lowest level, architectural innovation is increasingly focused on improving performance through increased concurrency, with approaches such as simultaneous multithreading or single-chip multiprocessors. Equally significantly, ubiquitous networks make collaboration among programs and users possible, but parallelism and communication introduce asynchrony.

Programming languages, despite the importance of asynchrony in reactive, event-driven, concurrent, or parallel applications, typically support asynchrony only through library mechanisms, such as threads, events, and synchronization, and provide no linguistic or error-checking features. Lack of support is a serious problem, as asynchrony makes the difficult task of programming even harder, since partially ordered behavior is harder to both understand and analyze and because nondeterminism obscures the cause of errors.

Thus what is needed is an improved asynchronous programming language, system or methodology that mitigates some of the aforementioned shortcomings of conventional languages.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention discloses, in one aspect thereof, a novel programming language extension for expressing asynchronous computations, which combines the well-known ideas of futures and joins. A programmer is now permitted to write interface contracts that prescribe the ordering and overlap of a collection of asynchronous functions. The language supports asynchronous programming by way of additional programming constructs and a behavioral type system that statically detects common errors. The language is an extension of a C# language that supports an alternative concurrent programming model based on futures, asynchronous function calls, and joins on futures, which are building blocks for asynchronous systems.

One aspect of the present invention provides that, on any given client and service interface, a novel technique for automatically extracting behavioral models of both the client interface and the service interface. The disclosed programming language is designed for modular checking where contracts are specified on interface boundaries, interface clients and providers (or services) are checked independently, and each method is checked separately. A client model and a service model are automatically extracted from the respective interfaces to arrive at the minimum number of relevant descriptions, which are the possible behavioral aspects that govern communicative interaction with respect to each other. This is performed on an individual function level, in contrast to conventional systems where this may be performed with much difficulty on the program as a whole. The client and server models are then passed to a model checker to systematically explore all of the possible interactions between the client and server code, including delays, reordering, etc., and to resolve ways in which to react to such possible interactions. Thus behavioral contracts can be stated on the asynchronous interfaces that prescribe the ordering and overlap of a collection of asynchronous functions.

A conformance checker uses the contracts to check that clients of the interface are invoked in the appropriate order and handle both normal and exceptional results, and the any interface client obeys the interface contract. The checker also checks that the interface's provider (or service) properly implements the contract. The checking algorithm combines region based type systems with model checking techniques to handle pointer aliasing in a sound way.

One aspect of the present invention provides a novel technique for automatically extracting behavioral models of both the client and the service that are then fed to a model checker. The model checker relies on a new application of region types, where regions are interpreted as equivalence classes of modeled objects. The extracted models are sound in the presence of aliasing, because the model checker interprets every object reference by nondeterministically choosing an object from its region.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
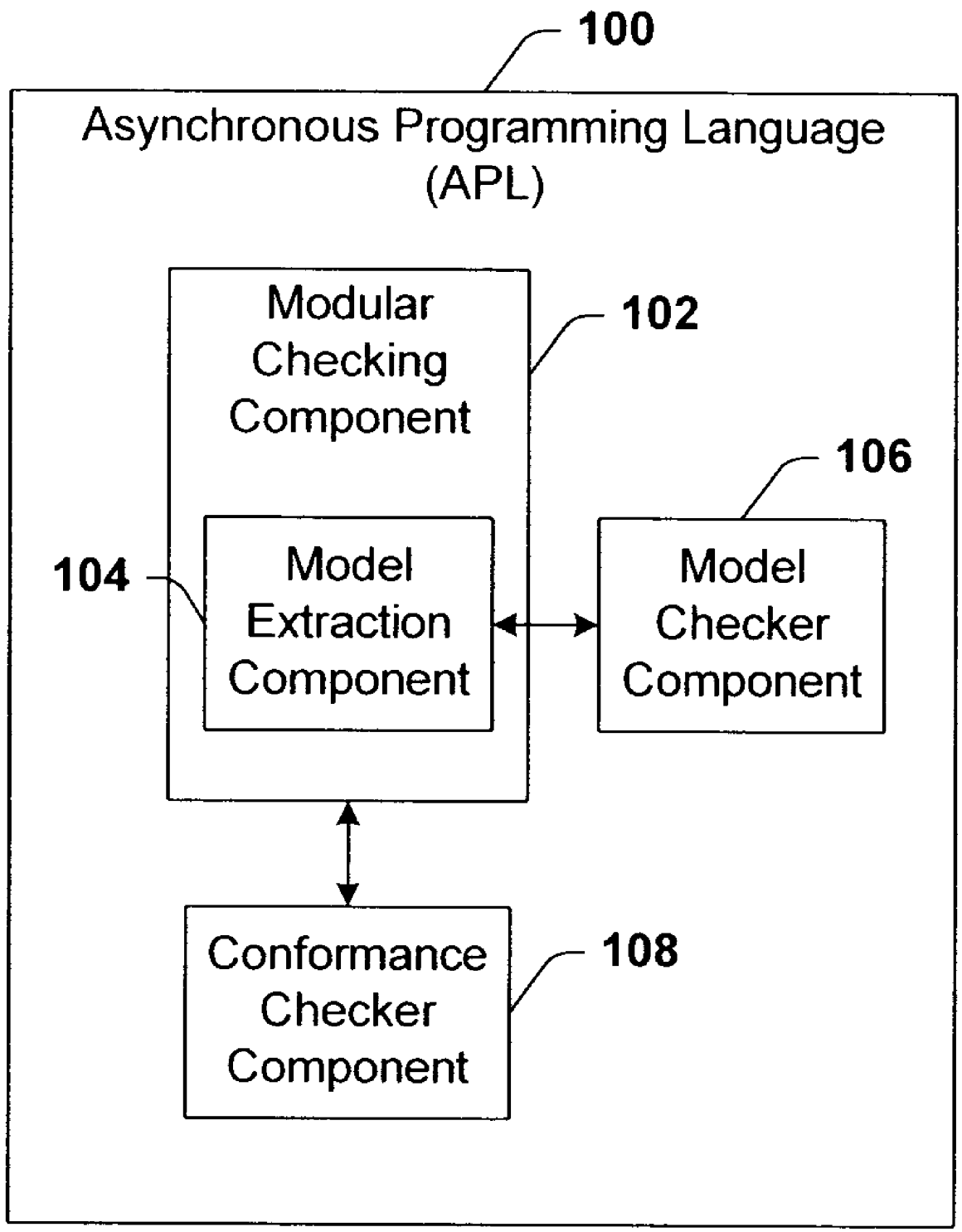
FIG. 1 illustrates a general block diagram of aspects of a programming language component, in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to FIG. 1, there is illustrated a general block diagram of aspects of an asynchronous programming language (APL) component 100, in accordance with the present invention, as described herein and according to the document in appended hereto, the contents of which are hereby incorporated by reference. There is provided a modular checking component 102 that functions to extract the minimum relative interactive descriptions between a client and a service. In furtherance thereof, the modular checking component 102 includes a model extraction component 104 that extracts a client model and a service (or provider) model from the respective client and service interfaces. The models are then passed to a model checker component 106 to systematically and methodically determine all of the possible interactions between the two models. Since this is an asynchronous regime, this includes, but is not limited to, delays that could occur when passing information between the client and the service, ordering problems that may occur, error messaging, and the resolution of such potential problems.

Once the model checker 106 determines the possible interactions, the behavioral aspects are well defined such that a "contract" is formed according thereto. The contract is then enforced by a conformance checker component 108 by ensuring that both the client and service conform to the contract. The conformance checker 108 uses the contract to both check that the clients of a respective asynchronous client interface are invoked in the appropriate order and that they handle both normal and exceptional results. The checker 108 also checks that the provider of the asynchronous provider interface is implemented according to its part of the contract. The modular checker 102 is capable of handling the complexity of programs written in a modern, object-oriented programming language. Note that the conformance checker component 108 may receive the results of the model checker component 106 directly therefrom (not shown), instead of through the modular checking component 102.

Figure 2:
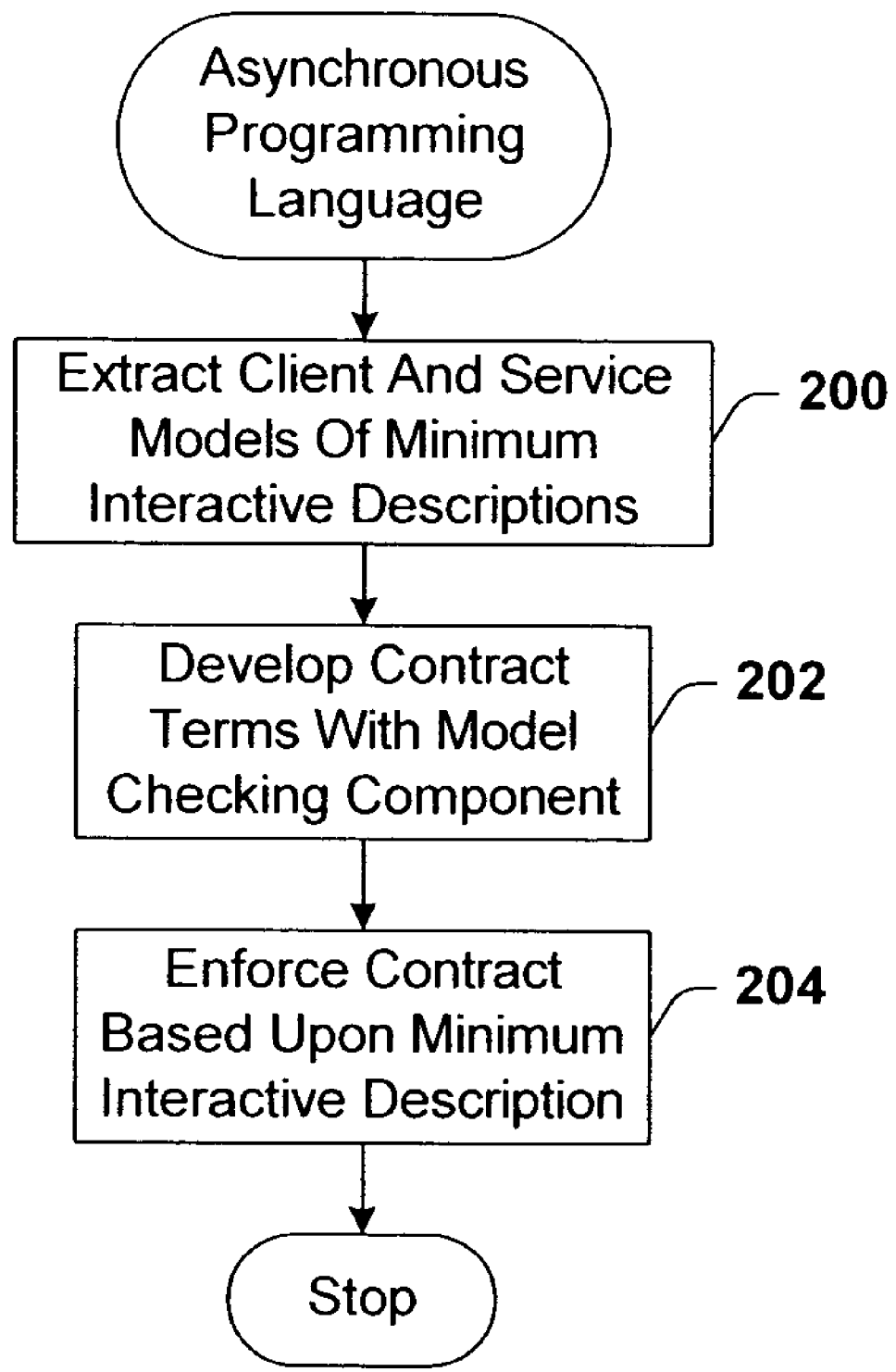
FIG. 2 illustrates a flow diagram of the process of the present invention.

Referring now to FIG. 2, there is illustrated a flow diagram of the process of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention. At 200, the modular checking component utilizes the extraction algorithm to extract models of the both the client(s) and the service(s). The respective models define the minimum interactive communication descriptions for the respective interfaces. At 202, model checking is performed to arrive at all possible interactive scenarios of the given descriptions, and responses thereto. These define the contract terms between the client and service in the asynchronous exchange. At 204, the contract terms are passed to the conformance checker to ensure that both the client and service adhere to the terms. Flow then reaches a Stop block.

The disclosed programming language extends the C# programming language with constructs for asynchronous programming. The constructs both provide natural abstractions for this type of programming and also facilitate the program analysis described herein. These constructs both provide natural abstractions for this type of programming and also facilitate the program analysis described in this paper. The first is an asynchronous call that returns a future-like handle to the eventual result of the call. The second is a synchronization statement similar to the join construct in the join calculus. The third is a facility to state behavioral contracts on service interfaces. The fourth is a transaction directive to delineate scopes of conversations by clients. The fifth is a tracked type qualifier used by the checker. The following Table 1 provides the formal syntax for these language extensions.

TABLE 1

Syntax Extensions for Asynchronous Programming

| 1. Future | |
|---|---|
| type | ::= future type |
| 2. Join | |
| timehead | ::= timeout(int) |
| param | ::= attributes$^{OPT}$ parammodifier$^{OPT}$ type id |
| fv | ::= Id |
|  | !id |
| joinhead | ::= fv$_1$(param$_1$$^{OPT}$) &...& fv$_n$(param$_n$$^{OPT}$) |
| joinrule | ::= joinhead → stmt |
|  | timehead → stmt |
| jointstmt | ::= join{ joinrule$_1$ +...+ joinrule$_m$ } |
| 3. Contract | |
| classdecl | ::= classhead classbody |
| classhead | ::= attributes membermodifiers |
|  | classident classbase |
|  | inputcon$^{OPT}$ corspec$^{OPT}$ |
| classbody | ::= { memberdecl$_1$...memberdecl$_n$ } |
| memberdecl | ::= methodocon$^{OPT}$ constructordecl |
|  | \| methodocon$^{OPT}$ methoddecl |
|  | \| fielddecl |
|  | \| otherdecl |

TABLE 1-continued

Syntax Extensions for Asynchronous Programming

| | | |
|---|---|---|
| inputcon | ::= | [contract C] |
| methodcon | ::= | [contract P] |
| C | ::= | null\|$e_1$? → $C_1$ +...+ $e_n$? → $C_n$ |
| | | \| $C_1$ \|...\| $C_n$ \| C* |
| P | ::= | null\|X\|P\|P\|recX.P |
| | | \| join {$I_1$ +...+ $I_n$ } \| $O_1$ #...# $O_n$ |
| I | ::= | $e_1$? &...& $e_n$? → P |
| O | ::= | return\|throw Exn\|ev!;P |
| corspec | ::= | [contract correlation type] |
| 4. Transaction | | |
| transaction | ::= | transaction(svcobjlist){stmt} |
| svcobjlist | ::= | $var_1$ $corid_1^{OPT}$,..., $var_n$ $corid_n^{OPT}$ |
| corid | ::= | correlate $var_1$...$var_m$ |
| 5. Tracked | | |
| type | ::= | tracked type |

Asynchronous Calls and Futures

In the disclosed programming language, as in Java and C#, procedures are methods in objects. These methods may be called synchronously, in the normal manner, or may be invoked asynchronously. An asynchronously invoked method executes concurrently with its caller. The asynchronous call itself completes immediately by returning a value called a future. The future is a typed handle on the result eventually produced by the method, and it provides a means to explicitly synchronize the two computations.

A future is a first-class value, created at an asynchronous call that can subsequently be stored, passed as an argument, or returned as a result. The futures herein are similar to futures popularized in Multilisp, except for a key difference being that the disclosed programming language requires the result contained in a future be explicitly retrieved through a join statement, rather than allowing it to be implicitly retrieved through a reference to the value of the future. Making this synchronization explicit fits better with the philosophy of a strongly typed language, such as C#, and the join construct is an expressive notation for describing the synchronization of several computations and for handling failure.

The asynchronous call construct extends C# invocation expressions by prefixing the keyword async to an invocation expression, as in:

async foo(1);

Associated with asynchronous calls are a new type constructor and a new type rule. If foo is declared as a method returning a value of type T, then an asynchronous call to foo returns a value of type future T.

The type constructor future extends C# type expressions by prefixing the keyword future to a type expression. A type of the form future T is called a future type, and a value of that type is a T-future. For example:

```
future int foo(int a) { ... }
future MyClass bar( ) { ... }
void baz (future string F) { ... }
``` declares a method foo returning an integer future, a method bar returning a future object of type MyClass, and a method baz accepting a string future as argument.

Future variables may be introduced by local declarations:

```
future T MyFuture1 = async foo(2);
future T MyFuture2;
MyFuture2 = async bar( );
``` or by field member declarations:

```
class MyClass{
    public future int MyFuture3;
    public void bax( ) { MyFuture3 = async bar( ); }
}
```

Figure 3:
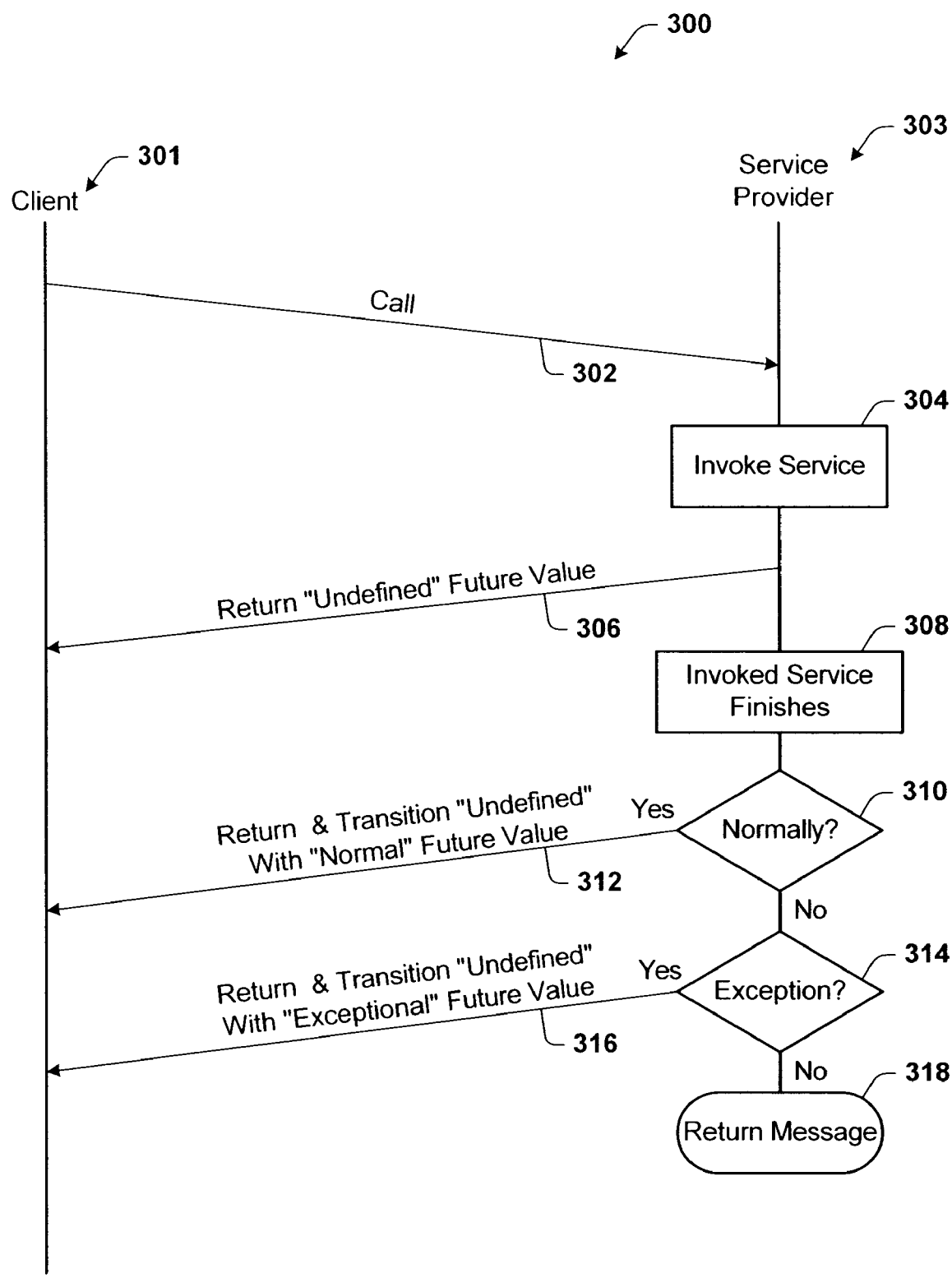
FIG. 3 illustrates a protocol exchange diagram between a client and a service provider.

Referring now to FIG. 3, there is illustrated a protocol exchange diagram 300 between a client 301 and a service provider 303. The client 301 submits an asynchronous call 302 to the service provider 303. The service provider 303 invokes a service, as indicated at 304. At 306, a new future value is returned substantially immediately to its caller, the client 301. The invoked method (or service), at 304, in the service provider 303 executes concurrently with the continuing process of returning the call, at 306. A future value is an object that is in one of three states: Undefined, Normal, and Exceptional. Initially, a future value is passed as Undefined to the client 301, as indicated at 306, and the value remains in that state in the client 301 until the invoked service computation of the service provider 303 finishes execution. Note that the order of the invoked service, at 304, and the returned future value, at 306, may be reversed, such that the future value is return immediately, before the service invocation. In either case, both processes are occurring substantially concurrently.

When the service computation completes execution, indicated at 308, a determination is made as to if the execution completed normally (i.e., returns a future value and does not generate an "exception") or exceptionally. If normally, at 310, the service provider 303 returns a "Normal" future value that transitions from the existing "Undefined" value in the client 301 to the "Normal" state, as indicated at 312. If the service computation does not complete normally, flow is to 314 to determine if the computation completed with an exception. If so, the service provider 303 returns an "Exceptional" future value that transitions from the existing "Undefined" value in the client 301 to the "Exceptional" state, as indicated at 316. A future value makes at most one state transition and then remains in that state. If the service computation does not complete with an exception, flow returns a message indicating such, indicated at 318.

The state of the future value can be examined, and the callee result retrieved, only in a join statement. Any other attempt to examine the state of a future value is a static type error that will be detected by the compiler.

Join Statements

A join statement is used to synchronize with computations in a set of futures and to retrieve values from them. The join is a blocking construct, which suspends the execution of a computation until a specified set of futures changes state or a certain interval elapses (e.g., a time out). The programmer specifies the combinations of successful and exceptional future completions that will satisfy the join. For example:

```
join {
    MyFuture4(T1 v1) & MyFuture5(T2 v2)
        -> Continue(v1,v2);
    !MyFuture4(Exception e) -> ProcessError(e);
    !MyFuture5(Exception e) -> ProcessError(e);
    timeout(1200) -> throw new TimeoutExn( ); }
```

MyFuture4 and MyFuture5 are future values created by asynchronous calls earlier in the program. The statement contains four join rules. The first is satisfied if both futures complete normally. In this case, the results of the two calls are bound to the new variables v1 and v2 and the method Continue is invoked. The next two rules handle the cases in which either asynchronous call returns an exceptional result. In either clause, the exceptional value is bound to the new variable e and the method ProcessError is invoked. The final rule specifies a time out interval of 1200 milliseconds for the join clause.

The join statement syntax includes the following. The future variables of a rule (joinrule) are the identifiers (id) referenced in $fv_1 \ldots fv_n$ in the head of the rule. The parameters of a rule are the identifiers in the list $param_{OPT1} \ldots param_{OPTn}$. The statements (stmt) following a join head are the continuation statements of the rule. The syntax class stmt is the C# statement and statement-block extended with the join statement joinstmt. The class id contains C# identifiers (variable names) and param contains C# formal parameters.

The type rules associated with a join statement are: future variables in a join rule must be of future type; in a join rule (joinhead), if a future variable not preceded by an exclamation mark $fv_i$ is of type future T, then param must be declared of type T; and, in a join rule (joinhead), if a future variable is preceded by an exclamation mark $!fv_i$, then $param_i$ must be declared to be an exceptional type.

The scope of a parameter in a join rule (normal or exceptional) is the continuation statements of the rule, and its occurrence in the head of the rule is binding for that scope.

The rules in a join statement are evaluated in order. The statement executes the continuation of the first rule whose left-hand side is satisfied. A rule is satisfied if all future variables in its head have transitioned out of the undefined state and the type of result matches the pattern in the rule. An unnegated future variable (fv) matches a future variable in state normal and a negated future variable (!fv) matches a future variable in state exceptional. If the join statement contains a time out rule and no other rule in the join is satisfied in at least the time specified in the time out, then this rule is considered satisfied and it is processed in the normal way.

At most one rule in a join may be satisfied. After the continuation of a satisfied rule completes execution, the join statement terminates and control passes to the subsequent statement in the program.

Contracts

Because asynchronous programming is inherently concurrent, bugs can be subtle and may only manifest themselves in certain interleavings among asynchronous activities. Message reordering in asynchronous message passing makes it very easy to introduce unintended behavior through inadequate synchronization.

The programming language provides a way to statically detect such errors, through source-level contracts. Contracts express stateful protocols governing the legal interactions between a client and a service. Contracts extend C# class declarations to express two aspects of the publicly visible behavioral interface of a class: (1) temporal constraints on the allowed sequences of invocations of methods of the class, and (2) the externally visible behavior of each method. Classes with contracts are referred to as services, and the contracts are sometimes called service contracts. The contract language is more general than similar efforts in sequential programs, as it models the effects of multiple clients concurrently accessing an interface. The programming language compiler contains a conformance checker, which checks that services and clients obey contracts. The programming language notion of contract conformance and the method for conformance checking are described hereinbelow.

The contract language syntax is as follows. Contracts consist of contract process expressions in C# class declarations (see Table 1). The syntax classes of the contract extension are given bold names. The details of standard C# class declaration syntax are omitted. The syntax class otherdecl covers omitted class member declaration forms (constant-, property-, event-, indexer-, operator-, destructor-, and type declarations).

The syntax class inputcon denotes contracts for input constraints and the syntax class methodcon denotes contracts for method constraints. Input constraints C and method constraints P are defined in a CSP/CCS-like language. Communicating Sequential Processes (CSP) is a language used to describe and reason about concurrent systems. It consists of a process algebra combined with a functional language. Calculus of Communicating Systems (CCS) is a language that has concurrent composition of processes and synchronous point-to-point communication. Input constraints are deterministic process expressions that have only input operations and in which parallel composition cannot occur within loops. More precisely, processes C are required to be is deterministic, and $C^* = rec\ X \cdot (C[X/null])$ provided C does not contain ∥. Contract process expressions that occur in input constraints and in method constraints and may contain event names belonging to the syntax class e. These names range over the method names and exception names that are in scope in the class declaration.

The semantics of input and method constraints is the standard CCS operational semantics extended with assignments and asserts. The character "#" is used to denote internal choice, and "+" to denote external choice.

Transactions and Tracked Types

In order to facilitate conformance checking, the client writer is allowed to delimit the scope of a "conversation," i.e., an instance of a concurrent interaction between the client and a set of service instances. Transaction directives are used within client code to do this. Since multiple simultaneous conversations are possible with a server, the transaction directive supports specifying correlation variables that uniquely identify the associated conversation. Finally, the client writer may single out certain types as being tracked, by prefixing the keyword tracked to a C# type expression or class name, as in class Conversation {tracked State MyState; ... }

The tracked modifier informs the programming language conformance checker that the State field of the Conversation class is relevant for checking the client against a contract within a transaction scope. The use of transactions and tracked types in conformance checking is explained in further detail hereinbelow.

EXAMPLES

The following Example 1 code contains the interface for a simple service that models an airline reservation system.

Example 1

Sample Airline Reservation System

```
[WebService]
public class Airline
[contract (Query? -> ( Buy? -> Cancel? + Cancel? ))* ]
[contract correlation Cid]
{
    [contract {throw AirlineException # return} ]
    future Info Query(Cid PO,string itinerary);
    [contract {throw AirlineException # return} ]
    future Info Buy(Cid PO);
    [contract {throw AirlineException # return} ]
    future Info Cancel(Cid PO);
}
```

The code exposes three entry points: Query, Buy and Cancel. A client must first call Query to check availability of a seat. Then it can either buy or cancel the reservation by calling Buy or Cancel, respectively. Furthermore, after purchasing the seat, the client of the airline is still allowed to cancel. Once canceled, the client can possibly start another query. The input constraint (Query?→(Buy?→Cancel?+Cancel?))* succinctly prescribes these sequencing constraints. The input constraint only specifies the set of all allowable sequences of method invocations, and does not force the client to actually make any method calls. For example, a client that calls Query followed by Buy is not necessarily forced to call Cancel. In addition, the method constraint throw AirlineException # return specifies that the body of the Query method can either return normally or throw an AirlineException.

As an example of using this service, suppose it is desired to build a travel agent to coordinate a reservation with an airline service (Airline) and a car-rental service (Rental) with the following objective: either purchase both the airline and car reservations, or cancel both. Assume that the service Rental has an interface isomorphic to the Airline service from Example 1. The following Example 2 illustrates a sample travel agent client.

Example 2

Sample Airline-Rental Client

```
Class TravelAgent{
    private Airline myAir;
    private Rental myRental;
    private CId myPO;
    void doAirlineAndRentalREservation( ) {
        myAir = new Airline( );
        myRental = new Rental( );
        myPO = new Cid( );
        transaction(myAir correlate myPO,
                myCar correlate myPO){
```

-continued

```
            String itinerary = User.getItinerary( );
            Future Info fAir =
                async myAir.Query(myPO,itinerary);
            Future Info fRental =
                async myRental.Query(myPO,itinerary);
            join { fAir & fRental    -> buyBoth( );
                + !fAir         -> cancelBoth( );
                + !fRental -> cancelBoth( );
        }
    }
}
```

The transaction directive is used to delimit the scope and specify correlation variables for the conversation. In this case, myPO is used as correlation for both the services. Note how the join construct is used to wait for both the futures fAir and fRental to complete.

The following Example 3 shows a buggy client that will be used as an example herein.

Example 3

Buggy Client Code

```
Class SimpleClient{
    private Airline myAir;
    private CId myPO;
    void startReservation( ) {
        myAir = new Airline( );
        myPO = new Cid( );
        //now interact with myAir using
        //myPO as the correlation id
        transaction (myAir correlate myPO) {
            String itinerary = User.getItinerary( );
            Future Info fInfo =
                async myAir.Query(myPO,itinerary);
            async myAir.Buy(myPO);
        }
    }
}
```

Although the client calls Query before calling Buy, the calls are asynchronous, so Buy can potentially be invoked before the call to Query completes. A correct client should synchronize on fInfo before calling Buy.

Conformance Checking

The disclosed programming language compiler checks if components of the program conform with the contracts that are specified on the interfaces. The checker separately checks for two kinds of conformance: (1) client conformance, which means that a client (a program using a service interface with contracts) obeys the contract of the service it uses, and (2) service conformance, which means that a service (an implementation of an interface with contracts) obeys the contract it implements. Client and service conformance are technically distinct forms of correctness. Intuitively, client conformance requires that the client code not violate the input constraints of contracts and handle all exceptions that the server can potentially raise. Service conformance requires that the service code implementing each service method is a refinement of its method constraint in the contract.

The fact that both notions of conformance only reference the contract to represent the other party (client or service) is the key to modular conformance checking. The provider of a service need not expose its implementation to clients. Similarly, the service can be written and evolved independently of its clients. Moreover, checking service conformance one method at a time further modularizes the problem of conformance checking. Because conformance checking relies on model checking, as described below, modularity is essential to mitigate the state explosion in conformance checking.

State

The contracts of the disclosed programming language are stateful. For example, the input constraint shown in Example 1 is initially in a state where only a call to Query is accepted. It then transitions to another state where either a call to Buy or to Cancel is accepted, and so forth. In addition, the state of the contract after a call to Query also indicates that the service may respond according to the method constraints on the Query method. The state of a contract is referred to as contract state.

Clients and services also have states, in their respective implementations. For example, the client shown in Example 2 enters states where two asynchronous calls are made. It then enters a state where it is ready to join on the services' responses. The state of a client implementation is referred to as client state, and the state of a service implementation, as service state. The essence of conformance checking is to relate these three kinds of states (i.e., the contract state, client state, and service state). Since clients run concurrently with the services they use, checking client conformance involves exploring the concurrent composition of the client state machine with the contract state machines of the services. Checking service conformance requires a comparison of the service state machine with the contract state machine according to a refinement relation.

Models

The programming language conformance checker relies on model checking to explore the relation between contract state, client state and service state. Using a type-based technique that is described in greater detail hereinbelow the checker extracts a model from each component of the program being analyzed. A model is an abstraction of a program component containing only communication actions, and operations that are relevant for maintaining the state of the communication protocol. Models are expressed in a model intermediate language, mIL, presented in the end of this section. Conformance checking is done in two steps. First, various mIL models—called interface models, client models, and service models are constructed from the disclosed program. Next, these models are fed into a model checker to check for client conformance and service conformance.

An interface model is constructed from a contract specification. It consists of a set of mIL process definitions, one for each method of the interface. Construction of interface models from contracts is described hereinbelow.

Client models and service models are constructed by extraction from the programming language code for the client and service respectively. Because client and service models need to represent the relevant communication actions of implementation code, models must soundly represent the objects on which those actions occur. Relevant data is those data structures that are directly contract relevant (such as futures, correlation identifiers), and that therefore need to be represented in models. In addition, the programmer can also indicate certain program variables as relevant using the tracked modifier. A key problem in model extraction is abstraction: to soundly represent relevant data and operations on them, while throwing away as much as possible of the program that is irrelevant to conformance. Since the programming language error detection is sound, pointer aliasing is a concern. For example, if x is relevant, the statement y·foo( ), may not be soundly ignores, if y and x might be aliased.

A novel feature of the model extraction algorithm is the use of regions to soundly model relevant data. To illustrate, the interface model for Example 1, the Airline service, is compiled into three mIL processes: $E_{Query}$, $E_{Buy}$, and $E_{Cancel}$. An asynchronous call in a client is then represented by, Future Info fAir=async myAir·Buy(myPO, itinerary)

by the mIL model statements,

LOCAL fAir=NEW[$\tau_F$] CHAN; RUN $E_{Buy}$ [$\tau_{myAir}$, fAir]

Here, the future fAir is represented as a new mIL channel, and the asynchronous call is modeled by spawning an instance of the interface process $E_{Buy}$. The names $\tau_{myAir}$ and $\tau_F$ refer to regions. Model extraction is described hereinbelow.

mIL and mILCruncher

The model checker, called herein mILCruncher, operates on models expressed in the mIL language. The following Table 2 contains the syntax for mIL.

TABLE 2 mIL Syntax.

| | | |
|---|---|---|
| e | ::= | true \| false\|*\|x\|CHOOSE[r]\|NEW[r] T\| a[$\vec{r}$]($\vec{e}$)\|e.f |
| S | ::= | e!k\|e?k\|a[$\vec{r}$]($\vec{e}$)\|RUN a[$\vec{r}$]($\vec{e}$) \| ATOMIC{S}\|JOIN{j$_1$+...+j$_n$}\|DELETE[r]\|e$_1$ = e$_2$ |
| | \| | IF(e){S$_1$}ELSE{S$_2$}\|TRY{S}CATCH(Exn){S}\|THROW Exn\|LET x = e IN e\|GOTO l\|l:S\| S;S |
| j | ::= | x$_1$ &...& → S |
| D | ::= | a[$\vec{r}$]($\vec{x}$){S}\|REF C {T$_1$f$_1$,...,T$_n$f$_n$}\|ENUM E {k$_1$,...,k$_n$}\|EXCEPTION Exn\|LOCAL T x |
| T | ::= | BOOL\|CHAN\|SET\|C\|E\|Exn |

Beyond usual types and control flow constructs, mIL provides features useful in modeling software. Futures are modeled with channels for send (e!k) and receive (e?k), and possibly asynchronous message queues used for inter-process communication. Receive operations can be collected together in a join construct, similar to that in the programming language. The mIL language provides conventional, synchronous function calls and a RUN construct, which can model the programming language's asynchronous function call. Statement blocks in mIL can be enclosed in an ATOMIC modifier, which is a model checker directive to execute the block atomically, thereby reducing the state explosion that arises from interleaving the statements in the block with other concurrent activities. In addition to usual value types, mIL has a notion of a region, which is a heap-allocated set of objects. There are two constructs used to model regions: NEW and CHOOSE. The expression NEW[r] T allocates a new object of type T in region r. NEW[ ] SET creates a new region that is an empty set, and CHOOSE[r] chooses a member of region r nondeterministically. DELETE[r] deletes a region, when no concurrent processes can reference it.

The scope of every client conversation is clearly marked in a program of the present invention using transaction directives. Every transaction directive in the program results in a client conformance check. To check for client conformance, the model extracted from client code and the interface models for the services listed in the transaction directive are fed into mILCruncher. mILCruncher then explores all possible interleavings of the asynchronous activities to check if the interface contract can be violated in any such interleaving. For example, when applying the client conformance check on the client in Example 3, mILCruncher is able to detect an interleaving where the effect process for the Buy method gets scheduled before the effect process for the Query method leading to an assertion violation in the effect process for the Buy method.

Service conformance is checked one service method at a time. For each method a, a model $B_a$ is extracted from the body of the method, and checked for conformance against method a's method specification $S_a$. More precisely, $B_a$ and $S_a$ are mILCruncher models and mILCruncher checks if $B_a \leq S_a$, where "$\leq$" is the conformance relation. Our current implementation of mILCruncher uses the SPIN model checker as a back-end. SPIN is a product of Lucent Technologies, Inc., and is a software verification that tool checks the logical consistency of a specification. Both client conformance and service conformance are translated into invariant checking queries on SPIN.

Interface Models

An interface model consists of a set of mIL process definitions $E_a$, called effect processes. These exists one effect process for each method a of the interface. Intuitively, the process $E_a$ models the method a with respect to the effects that a call to a has on the contract state, the future created at an asynchronous call to a, and the futures passed into a.

An effect process $E_a$ has two components: a process $C_a$ that models the effect of the call a on the contract state that is implicitly specified by the input constraint C of the contract, and a process mil(P) that models the method constraint P of the contract on a. Process mil(P) can be constructed from the method constraint P in a straightforward way. More precisely, the effect process $E_a$ is parameterized by two names, $r_S$ and $c_F$. The first parameter, $r_S$, is a region name used to represent the state of the contract. The second parameter, $c_F$, is an mIL channel parameter representing the future created at an asynchronous call. The effect process $E_a$ is defined by, $$E_a[r_S,c_F]\{ATOMIC\{\sigma_{r_S,c_F}(C_a)\}; \sigma_{r_S,c_F}(mil(P))\},$$

where $\sigma_{r_S,c_F}$ is a map that translates return and throw statements into message passing operations on the channel $c_F$ and state variable accesses into references of the state region name $r_S'$, (1) for each state variable $x_i$: $\sigma_{r_S,c_F}(x_i)=r_S \cdot x_i$, (2) for each return statement in P: $\sigma_{r_S,c_F}(return)=c_F!RETURN$, (3) for each throw statement in P: $\sigma_{r_S,c_F}(throw\ Exn)=c_F!Exn$.

The parameterization of $E_a$ on state $r_F$ and $c_F$ is essential for instantiating effect processes in the models: different calls into a service belonging to the same contract instance (transaction) can affect the same contract state in mIL models, by having the model pass the same state variable $r_S$ at each call. Calls belonging to different instances pass different state variables. Calls create different futures, on which responses come back from the service, which is modeled by passing different channels $c_F$ to effect processes.

The algorithm for constructing $C_a$ is as follows. The input constraint C is considered as a rooted labeled transition graph, G(C) with root r(C). The nodes of G(C) are labeled by null, →, and ||. The arcs are either unlabeled or labeled by the method names $a_i$ occurring in C. The following four rules translate C into a labeled transition graph by induction on C: (1) If C=null, then G(C) is a single node r(C) labeled null; (2) If C=$a_1$?→$C_1$+ . . . +$a_n$?→$C_n$, then r(C) is a new node labeled +, with n new child nodes, each labeled →. The arcs from r(C) to the child nodes are unlabeled. For each $i^{th}$ child node, there is an arc labeled $a_i$ from the child node to r($C_i$); (3) If C=$C_1 \| C_2$, then r(C) is a new node labeled || with two child nodes, r($C_1$) and r($C_2$). The arcs from r(C) to r($C_1$) and r($C_2$) are unlabeled; (4) If C=$C_1$*=recX·($C_1$[X/null]), then r(C)=r($C_1$), and G(C) arises from G($C_1$) by adding unlabeled edges from the nodes labeled null back to r(C).

Note that due to restrictions on the syntax, a node labeled with || cannot be part of a cycle in G(C). Using G(C), a set of state machines are assigned to C as follows. A sequential subgraph of G(C) is a maximal subgraph of G(C), whose root node is either r(C) or a node whose parent in G(C) is labeled ||, and such that it has nodes labeled || only at leaf nodes (nodes with no arcs leaving them). Each sequential subgraph represents a sequential state machine. Each $j^{th}$ machine is encoded using a state enumeration type $\{n_{j_l}, \ldots, n_{j_m}\}$ naming the $j_m$ individual nodes in the subgraph, together with an enabled bit $b_j$ indicating whether the machine is active. In order to generate the method constraints for method a, let $<n, a, n^l>$ denote an a labeled edge from node n to node $n^l$ in G(C). Let $M_{<n, a, n^l>}$ be the sequential state machine in which the a-labeled edge from n to $n^l$ occurs (by determinism of C, there is exactly one such machine), and let $<n_1, a, n_1^l>, \ldots, <n_k, a, n_k^l>$ be all the a-labeled edges in G(C). Then process $C_a$ becomes,

```
if(M<n₁,a,n'₁>.b == true && M<n₁,a,n'₁>.state == n₁)
    then {M<n₁,a,n'₁>.state= n'₁;S₁}
  . . .
else if(M<nₖ,a,n'ₖ>.b == true && M<nₖ,a,n'ₖ>.state == nₖ)
    then {M<nₖ,a,n'ₖ>.state= n'ₖ;Sₖ}
else assert(false);
``` where $M_{<n_1,a,n_1'>} \cdot b$ denotes a state variable holding the enabled bit, and $M_{<n_1,a,n_1'>} \cdot state$ is a state variable ranging over the node states of the machine $M_{<n,a,n'>}$. The statements $S_i$ in the then-statements above are defined to be empty, if the node $n'_i$ is not labeled with ||. But if it is, then $S_i$ is the statement $M_{i_1} \cdot b=true; \ldots, M_{i_q} \cdot b=true$; where the $M_{i_1} \ldots M_{i_q}$ are the state machines associated with the components of the parallel composition at node $n'_i$.

For example, consider the input constraint C from Example 1. The graph G(C) has three nodes $n_1$, $n_2$, and $n_3$, labeled with →, + and → respectively with $n_1$ as the root node. The graph has four edges $\langle n_1, Query, n_2 \rangle$, $\langle n_2, Buy, n_3 \rangle$, $\langle n_3, Cancel, n_1 \rangle$, $\langle n_2, Cancel, n_1 \rangle$. The state variable for this sequential machine has the enumerated type $\{n_1, n_2, n_3\}$. The effect process $E_{Query}[r,c]$ is given by:

```
E_Query [r,c]{
    ATOMIC{IF (r.M.b = = true && r.M.state = = n₁)
        THEN r.M.state =n₂; ELSE ASSERT(false);}
    IF (*) THEN c!AirlineException; else c!RETURN;
    }
```

Program Models

The extraction algorithm uses a new combination of region type systems and model checking. Objects that are relevant, i e., that need to be represented in the model, are associated with region names in an underlying type system. Regions represent equivalence classes of objects based on aliasing relationships in the program. These equivalence classes are represented by region names produced as a result of type inference. The region type system guarantees that two variables with different region names can never point to the same object. Two variables with the same region name may (or may not) point to the same object.

To be sound, the mIL models extracted must contain all changes to objects that are relevant. This is achieved by explicitly representing the association between relevant objects and their containing regions in the mIL model. There are several consequences of such a representation. An assignment such as y·val=10 is abstracted differently depending on whether y is relevant or not. If y is not relevant, then the assignment will be omitted from the model. This is sound because the region type system guarantees that y will never alias any relevant object. If y is relevant and is associated with a region name r, then the assignment is represented in the mIL model as LET t=CHOOSE[r] IN t·val=10, resulting in the model checker nondeterministically choosing an object in the region r and updating its val field to ten.

A test such as if (x·val<5) in the program of the present invention is also abstracted differently depending on whether x is relevant. If x is not relevant, the model contains a nondeterministic choice IF (*). If x is relevant and is associated with region p, then the test is abstracted as LET t=CHOOSE[p] IN IF(t·val<5), resulting in the model checker non-deterministically choosing an object in the region p and inspecting the value field of the object. An assignment such as x=y where x and y are references to an object potentially containing relevant fields does not need to be represented in the mIL model, since the region type system ensures that x and y have the same region name.

The region type system is polymorphic to increase precision, which results in polymorphic region variables appearing as parameters to methods. Consequently, the mIL model contains region variables, which are instantiated with region names during method calls inside the model checker. For simplicity, primitive types such as integers are "boxed", so they can be tracked by region annotations.

In general, relevant objects associated with protocols will not be heavily aliased. In the examples considered, regions associated with relevant objects tend to be singleton sets containing just one object, and consequently no loss of precision or efficiency occurs in the model checker. However, the extraction scheme guarantees soundness even in the presence of aliasing, at the cost of forcing the model checker to explore more paths and reduce the precision. At each object access, the model checker will have to explore a number of nondeterministic choices proportional to the size of the regions.

Regions and Relevant Types

Following conventional practices, region types have the form $(\tau, p)$, where a type $\tau$ is paired with a place p. A place is either a region name, $\tau$, or a region variable, p. Region variables represent region parameters on methods, and region names represent actual regions. In the instant system, assigning a region type $(\tau, p)$ to an object marks it as relevant: in addition to having type $\tau$, a relevant object belongs to a unique region p, which will be represented in the program model. Futures, service objects, and correlation identifiers are automatically regarded as relevant. Tracked types, as specified by the programmer with tracked declaration, are automatically relevant. Non-relevant data are assigned non-relevant types of the form $\tau$ without a region name. Hence the disclosed region system is partial, in that only relevant data are directly assigned region types. This differs from conventional methods. The type system ensures that relevant types are assigned consistently, so that relevant values may only be assigned to relevant variables and passed to methods with relevant parameters.

Region information is illustrated in the continuing examples. The following Example 5 shows the Airline client with region information.

Example 5

Client with Region Information

```
class SimpleClient<ρ'₀,ρ'₁> {
private Airline myAir: (AIRLINE, ρ'₀);
private Cid MyPO: (C_{ID}, ρ'₁);
void startReservation[ρ₀,ρ₁] (SimpleClient[ρ₀,ρ₁] this)
{
    myAir AT ρ₀ = new Airline( ) AT ρ₀;
    MyPO AT ρ₁ = new Cid( ) AT ρ₁;
    //now interact with myAir using
    //MyPO as the correlation id
    transaction (myAir correlate MyPO) {
        String itinerary = User.getItinerary( );
        LETREGION ρ_{c_1} {
            Future Info info1 AT ρ_{c_1} =
                async Query[ρ₀,ρ₁] (myAir,MyPO,itinerary);
            LETREGION ρ_{c_2} {
                Future Info info2 AT ρ_{c_2} =
                    async Buy[ρ₀,ρ₁] (myAir,MyPO);}}
}}
```

Example 5 shows the result of region inference over the relevant Airline client from Example 3. This information guides the abstraction into mIL. However, at this stage, it simply makes explicit the type structure of the region-analyzed program. Variables myAir and MyPO are assigned relevant types of the form $(\tau, \rho)$, because myAir is specified as a service object, and myPO as a correlation identifier in the transaction construct. The underlying types of variables of relevant types are explicitly expressed, as in myAir: (AIRLINE, ρ'₀). When objects of relevant type are dereferenced, the region is mentioned, as in new Airline( ) AT ρ₀ (it has done so only in some cases, for brevity).

On method declarations, the parameters of the region are written over which the method's polymorphic region type is quantified, as in startReservation [ρ₀, ρ₁]( . . . ). Methods are assigned region-polymorphic types of the form $\forall \alpha \rho \epsilon (\mu_1, \ldots, \mu_n) \to^\Phi \mu$, with α ranging over types, ρ over region variables, and ε over effects. The region variables mention the regions the method touches. In addition, Φ is a static effect set, which indicates which actions the method performs on the regions it touches.

In the example, the method startReservation operates on relevant data stored in the fields myAir and MyPO. Region inference therefore infers that startReservation needs to be passed the corresponding region variables as parameters. At call sites, region names are passed explicitly, as in Query[ρ₀, ρ₁]( . . . ).

Region type parameters are made explicit in class types, as in SimpleClient[ρ₀,ρ₁] (references to the this parameter were elided in the method, for brevity). The parameters range over the region variables of the relevant types (transitively) contained in the class. This is essential for tracking operations on regions that are made indirectly through non-relevant data. In the example, the SimpleClient class itself is not relevant, but its fields are. To track operations on the fields of a SimpleClient object, the regions must be represented in the region parameters of the class type. The annotation LETREGION $\rho\{S\}$ introduces a new region with static name $\rho$ in the scope S.

Extraction Algorithm

The extraction algorithm is formulated on a core sub-language of the novel programming language with region information, as illustrated in Table 3.

TABLE 3

Core Language With Region Information.

| | | |
|---|---|---|
| e | ::= | c\|x\|new C( )\|foo[$\vec{p}$]($\vec{x}$)\|e.f\|e AT p |
| S | ::= | e = e' \|local Tx AT p\|if(e)\{$S_1$\}else\{$S_2$\} |
| | | $S_1;S_2$\|LETREGION $\rho\{S\}$ |
| | \| | x AT p = async foo[$\vec{p}$]($\vec{x}$)\{S\}\|join($j_1$+...+$j_n$) |
| | | transaction(o at $p_0$ correlate x at $p_x$)\{S\} |
| j | ::= | $x_1$ AT p($T_1y_1$) &...& $x_m$ AT p($T_my_m$)→\{S\} |
| D | ::= | foo[$\vec{p}$]($\mu_1x_1,...,\mu_nx_n$)\{S\} |
| | \| | class C<p>\{$\mu_1f_1;...\mu_nf_n;$\} |

The following Table 4 presents the algorithm as a translation from core programming language to mIL. What is shown is how relevant objects are modeled, using region information.

TABLE 4

Translation of Programming Language into mIL

Expressions (e)
| | | |
|---|---|---|
| 1 | [foo[$\vec{p}$]($\vec{x}$)] | = foo[$\vec{p}$] |
| 2 | [new C( ) AT p] | = NEW[p] [C] |
| 3 | [e AT p] | = CHOOSE [p] (where e is flattened) |

Statements (S)
| | | |
|---|---|---|
| 4 | [e = e'] | = [e] = [e'] |
| 5 | [if(e)\{$S_1$\}else\{$S_2$\}] | = IF([e])\{[$S_1$]\}else\{[$S_2$]\} |
| 6 | [local T x at p] | = LOCAL [T] x |
| 7 | [$S_1;S_2$] | = [Red($S_1$)],[Red($S_2$)] |
| 8 | [LETREGION $\rho\{S\}$] | = LOCAL SET r = NEW[ ]SET; |
| | | [S[r/ $\rho$] ]; |
| | | DELETE[r] |
| 9 | [x AT $\rho$ = async foo[$p_0,\vec{p}$]($x_0,\vec{x}$)\{S\}] = |
| | LOCAL CHAN $c_F$ = NEW[p] CHAN; |
| | x = $c_F$; |
| | RUN $E_{foo}$ [$p_0,c_F$]; |
| | [S] |
| 10 | [join\{$j_1$+...+$j_n$\}] = JOIN\{[$j_1$]+...+[$j_n$]\} |
| 11 | [$x_1$ AT p($T_1y_1$) &...& $x_m$ AT p($T_my_m$)→\{S\}] = |
| | $x_1$ &...& $x_m$ →\{[S]\} |
| 12 | [transaction(o at $p_0$ |
| | correlate x AT $p_x$) \{S\}] = [ S]\{$p_0 \rightarrow p_x$\} |

The behavior of a program is projected with region information to the relevant regions.

(1) Operations that have static effects (in terms of the underlying region-effect type system) on relevant regions are modeled. In particular, allocations into relevant regions are executed by having the model checker allocate objects in the region; dereferencing an object field in a relevant region is executed by having the model checker non-deterministically choose an object in the region and dereferencing it; methods are modeled as functions of their region parameters.

(2) Statements that have no static effects on relevant regions are omitted from the model.

(3) Control decisions based on the values of non-relevant objects are interpreted by the model checker as non-deterministic choice.

Table 4 contains the key features of the disclosed extraction algorithm. The core language considers a method as a function of the object to which it belongs, which is passed as its first parameter (this-parameter). Hence, all symbolic memory references are through local variables or parameters, represented by x in the core language. Equation 3 of Table 4 assumes that expressions e are flattened, so that all intermediate expressions are explicitly named through locals. For example. y=e·f is written as tmp=e; y=tmp·f. The extraction function in Table 4 omits optimizations, which are described later. For brevity, region information AT $\rho$ is left out in the examples below.

The model of a method (Equation 1 of Table 4) is a function of its region parameters. A method call foo [ $\vec{p}$ ] ( $\vec{x}$ ) becomes foo [ $\vec{p}$ ] in the model—actual parameters are projected away and region names kept. This soundly models methods that access relevant data through non-relevant parameters, without explicitly modeling non-relevant objects. For example, let c be a non-relevant class with relevant field state, and suppose bar is defined by:

void bar[$\rho$](C[$\rho$]x)\{x·state=new state( )AT $\rho$\}

(region information is omitted on x·state for brevity). At a call, bar [$\rho_0$] (x0), the region $\rho_0$ is passed to the method model: bar[$\rho$]\{NEW[$\rho$][State]\}. The assignment does not need to be modeled, as explained hereinbelow. Since region inference only constructs local region equivalence classes, parameter-aliasing created by calls is modeled by region passing in the model. For example, consider the baz:

void baz[$\rho_0,\rho_1$](C[$\rho_0$]) x, C[$\rho_1$] y) \{
 x.state = new State( ) AT $\rho_0$;
 y.state = new State( ) AT $\rho_1$\}

At a call, baz [$p_0, p_0$] (x0, x0) , the region $\rho_0$ associated is passed with x0 to the method model, so the call becomes baz [$p_0, p_0$] The model of baz is:

void baz [$\rho_0, \rho_1$] \{NEW[$\rho_0$] [State]; NEW [$\rho_1$] [State]\} and hence, the call in the model captures that there are two allocations into memory region $p_0$. Not all calls to methods need to be modeled. If foo is:

void foo(C[$\rho$] x, C[$\rho$] y) \{x·state=y·state\} call need not be modeled to foo, since the type rules already identified that the region parameters associated with x and y are in single region, $\rho$, and the effect of the assignment is taken into account that way. Correctly distinguishing such cases is done symmetrically with the effect types of the region type system.

Allocation (Equation 2 of Table 4) new C( ) AT p, into region p becomes NEW[p][C], which creates a new model object in region p, with mIL format [C]. The format [C] of the mIL object contains only relevant fields from C. If C is a service class, then it is treated specially, so that [C] denotes the contract state structure associated with C's contract.

Memory references (Equation 3 of Table 4) e AT p are modeled uniformly in Table 4 by non-deterministically choosing an object in region p, by CHOOSE[p]. However, it is observed (omitting details for lack of space) that symbolic memory references should be treated through locals and parameters differently. References through a local can be modeled concretely by a local in the model, but when referencing relevant data through a parameter should fall back on the region abstraction, so a parameter reference $x_{prm}$ AT p becomes CHOOSE[p]. This abstraction is still needed, since relevant objects are passed-by-region in the model. For example, if $x_{prm}$ is a parameter, then local y AT p=$x_{prm}$ AT p becomes modeled in mIL by LOCAL y=CHOOSE[p].

Statements are modeled component-wise (Equations 4-12 of Table 4). Locals of relevant type are represented in the model as mIL locals (Equation 6). For the LETREGION statement (Equation 8), the first mIL statement, LOCAL SET r=NEW[ ] SET, creates a new region (SET) and binds it to r. The second translates the scope S of the LETREGION, while binding the region variable ρ to the newly created region. Finally, the third statement, DELETE[r], deallocates the region r at the end of the scope, provided no live processes reference r (reference-counting is used).

An essential part of model extraction consists in model reduction, that omits statements unnecessary either because they do not affect or depend on relevant data, or because region types subsume their effects on relevant data. Model reduction is captured by function Red in Equation 7 of Table 4. Its definition relies on static effects, which are part of conventional region type systems. Every source statement is assigned a set of static effects, of the form read(p), write(p), new(p), comm(p), which describe, in abstract form, the effect, if any, of the statement on relevant regions. To illustrate, writing Eff(S) for the static effect of statement S, results Eff(new C( ) AT p)={new(p)}, Eff(x AT p)={read(p)}, Eff(x AT p=c)={write(p)}, Eff(join x AT p→{S})={comm(p)}. Statements with no side-effect on relevant regions are assigned empty effect sets and can be elided from the model. Writing "_" for "no region," for example, results in Eff(new C( ) AT_)=θ, Eff(x AT_)=θ. The effect analysis must be fine-grained, as some statements have effects in some parts but not others. For example, in x AT_=foo[p](y) the call to foo must be modeled if foo has an effect on relevant region p, even though the assignment to x can be omitted. In general, assignments (other than assignments to relevant locals are kept) can be elided, because region name unification by the type rules takes them into account. For example, (x·state) AT p=y·state AT p can be elided, because the region name p is associated with both references.

The model of an asynchronous call (Equation 9 of Table 4) must represent two things: (1) the future value created at the call, and (2) the call's effect on the interface contract of the called method. Consider the call x at p=async foo[$p_0$, $\vec{p}$ ]($x_0$, $\vec{x}$){S}, where S is the continuation of the call. The future created at this call is modeled by a new mIL channel, $C_F$, which is allocated into the relevant region p associated with the return value of the call. After assigning the future to the local x, the model executes the mIL statement RUN $E_{foo}$ [$p_0$, $c_F$] that spawns an instance of the effect process $E_{foo}$.

In the interface process, call $E_{foo}$[$p_0$, $c_F$] passes the region name $p_0$ associated with the service object containing foo (this parameter, $x_0$) and the future channel, $c_F$, to the effect process. Recall that the region parameter for a service object ($p_0$ in this case) holds the service contract state. Passing the region threads contract state through clients of a contract, so that the model correctly maintains contract state across multiple calls to the same interface instance. A call to foo through a different service object affects an independent instance of the contract state.

A future channel, $c_F$, is also passed to the interface process. Recalling previously, that the method constraints of foo are compiled into communication actions on the channel parameter $E_{foo}$. This correctly threads the contract's communication effects across distinct asynchronous calls. For example, two calls to foo (even through the same service object) give rise to distinct communication events in the mIL model, as they operate on distinct channels. However, these calls correctly affect the same contract state.

A transition directive enclosing a statement S is translated to the mIL statement [S] {$p_0 \mapsto p_x$}, where $p_0$ is the region of the service object o, and $p_x$ is the region of the correlation identifier x. A transaction scope identifies a particular contract instance, so that, within S, only asynchronous calls that pass a correlation identifier within a region $p_x$ to service object $p_0$ will be modeled in that scope, and hence the translation [S] {$p_0 \mapsto p_x$} is qualified by the association of $p_x$ to $p_0$. If no correlation is specified, then all calls addressed to the service object $p_0$ are modeled. Transactions may occur in loops or triggered by external events unbounded in number. In such cases, the transaction directive scopes conformance checking to one generic instance of a conversation.

Applying the algorithm to the client method in Example 5 produces the model in the following Example 6.

Example 6

Model of Airline Client

StartReservation [$p_0,p_1$]{
    NEW[$p_0$][Airline];
    NEW[$p_1$][Cid];
    LOCAL $r_{c_1}$= NEW[ ] SET;
    LOCAL info1 = NEW[$r_{C_1}$] CHAN;
    RUN $E_{Query}$[$p_0$,info1];
    LOCAL $r_{C_2}$ = NEW[ ] SET;
    LOCAL info2 = NEW[$r_{C_2}$] CHAN;
    RUN $E_{Buy}$[$p_0$,info2];
    DELETE [$r_{C_2}$];
    DELETE [$r_{C_1}$]
}

The effect processes $E_{Query}$ and $E_{Buy}$ are scheduled concurrently and instantiated with the same state, $\rho_0$. With this model, mILCruncher detects an interleaving in which the effect process for the Buy method is scheduled before the effect process for the Query method, leading to an assertion violation.

The asynchronous constructs of the disclosed programming language have many connections with previous languages. None of these previous languages, however, support contracts or provide techniques to statically check program behavior. The disclosed novel futures are inspired by futures in Multilisp. Futures have appeared in many other languages, such as CML, where they are not primitive, but are implemented with CML events. The join construct of the disclosed programming language is inspired by the join calculus, and is also the basis of a similar construct in Polyphonic C#, another extension to C#. The disclosed joins differ in that they synchronize dynamic, first-class futures rather than statically declared method entries. The timeout feature disclosed herein with respect to joins is similar to a construct in the Orc language.

The notion of contracts and algorithm for conformance checking in the disclosed programming language are related to a number of recent systems in software model checking, static analysis, and behavioral type systems. Systems such as SLAM, ESC Java, Vault, and ESP, check sequential specifications against sequential code. By contrast, concurrency is a primitive for the disclosed language contract-checking algorithm. Moreover, several of these conventional tools rely on global alias analysis for sound model extraction, whereas the disclosed language uses region-and-effect analysis to extract its model and further refines the alias relationships at model-checking time. The Bandera toolkit model checks concurrent Java programs. Its model extraction is based on program slicing and a user-supplied abstraction library. The disclosed model extraction algorithm uses type-and-effect inference and source-level tracked types. Moreover, unlike Bandera, the disclosed programming language uses programmer-specified contracts to separately check client and server code.

The disclosed model extraction algorithm builds on previous work in type-and-effect systems, both for region-based memory management and for concurrent behavior analysis. The disclosed regions are used to control sound model extraction and for garbage collection in the model checker. In addition, the disclosed regions are re-interpreted as sets with a non-deterministic choice operator.

Programming languages are powerful tools for expressing and checking complex systems. The disclosed programming language provides an effective programming model for asynchronous computation and for performing lightweight, modular checking of concurrent control properties. The checking algorithm is a novel combination of techniques from type inference and model checking.

Figure 4:
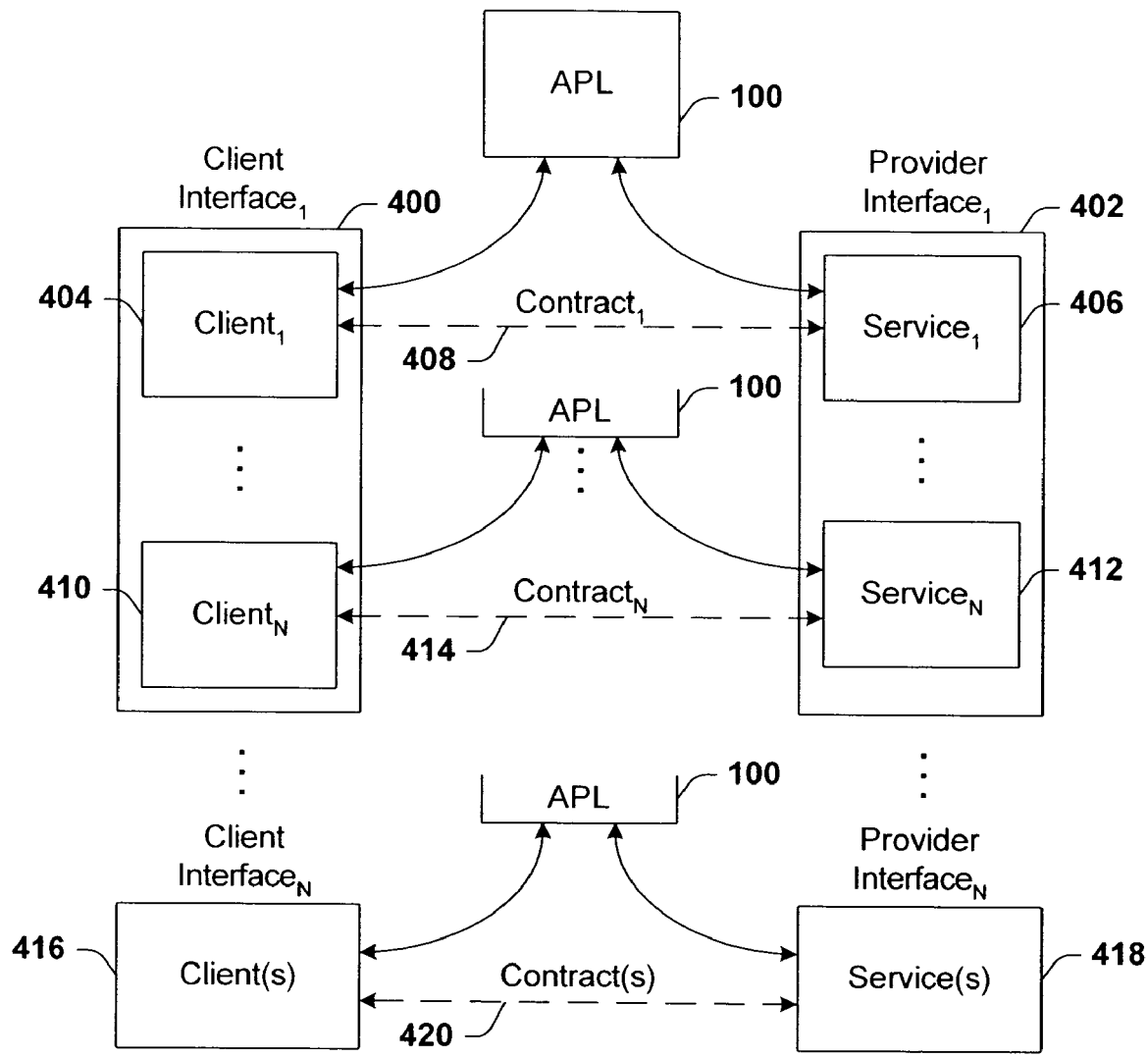
FIG. 4 illustrates a general system implementation of the asynchronous programming language of the present invention.

Referring now to FIG. 4, there is illustrated a general system implementation of the APL 100 of the present invention. A first client interface 400 (also denoted Client Interface$_1$) includes one or more clients (also denoted Client$_1$, . . . , Client$_N$) that interface with a first provider interface 402 (also denoted Provider Interface$_1$) via a network (not shown). The provider interface 400 includes one or more service providers (or services) (also denoted as Service$_1$, . . . , Service$_N$) that provide services to the clients. The first client interface 400 includes a first client 404 (also denoted Client$_1$) seeking services from a first service provider 406.

In accordance with the present invention, the disclosed APL 100 allows asynchronous interaction between the clients of the first client interface 400 and the services of the first service provider 402 by extracting models and, defining and enforcing contracts therebetween. Thus a first contract 408 (also denoted Contract$_1$) is generated between the first client 404 and the first service 406 by providing the capability to extract a corresponding model from each of the first client 404 and the first service 406, define the contract terms in accordance with asynchronous language, and enforce the first contract 408 with the conformance checker.

Similarly, where the first client interface 400 includes an Nth client 410 (also denoted Client$_N$) seeking services from the provider interface 402 that includes an Nth service 412 (also denoted Service$_N$), an Nth contract 414 (also denoted Contract$_N$) is created and enforced. Of course, in network environments, there may be a plurality of individual client interfaces, such that an Nth client interface 416 (also denoted Client Interface$_N$) communicates with an Nth provider interface 418 (also denoted Provider Interface$_N$) to access services provided therein. Thus, a number of corresponding contracts 420 may be created and enforced for asynchronous data exchange in accordance with the present invention.

Figure 5:
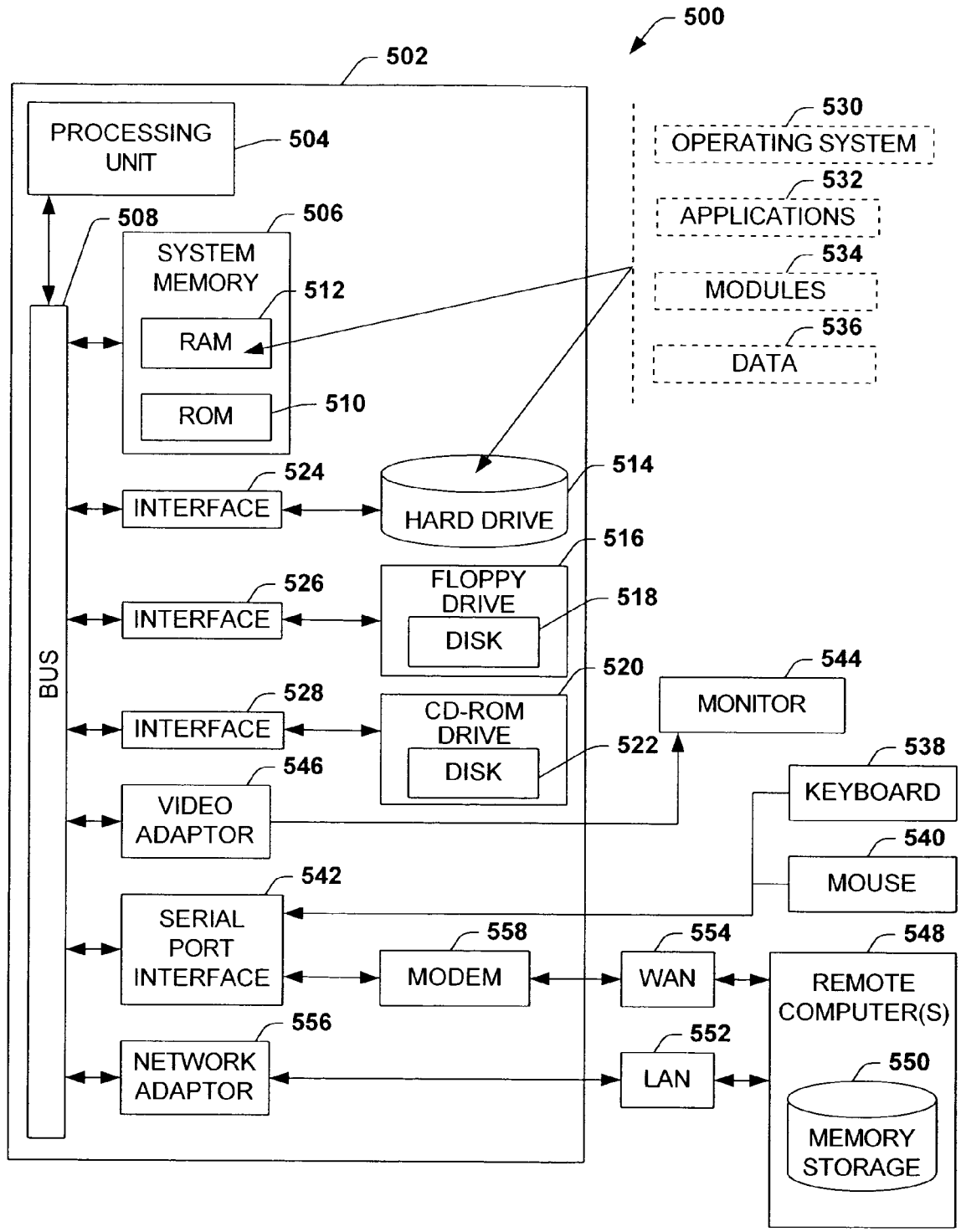
FIG. 5 illustrates an exemplary computing environment in which the inventions may be implemented.

Referring now to FIG. 5, there is illustrated an exemplary computing environment 500 in which the inventions may be implemented. The environment includes a computer 502, the computer 502 including a processing unit 504, a system memory 506 and a system bus 508. The system bus 508 couples system components including, but not limited to the system memory 506 to the processing unit 504. The processing unit 504 may be any of various commercially available processors. Dual microprocessors and other multi-processor architectures also can be employed as the processing unit 504.

The system bus 508 can be any of several types of bus structure including a memory bus or memory controller, a peripheral bus and a local bus using any of a variety of commercially available bus architectures. The system memory 506 includes read only memory (ROM) 510 and random access memory (RAM) 512. A basic input/output system (BIOS), containing the basic routines that help to transfer information between elements within the computer 502, such as during start-up, is stored in the ROM 510.

The computer 502 further includes a hard disk drive 514, a magnetic disk drive 516, (e.g., to read from or write to a removable disk 518) and an optical disk drive 520, (e.g., reading a CD-ROM disk 522 or to read from or write to other optical media). The hard disk drive 514, magnetic disk drive 516 and optical disk drive 520 can be connected to the system bus 508 by a hard disk drive interface 524, a magnetic disk drive interface 526 and an optical drive interface 528, respectively. The drives and their associated computer-readable media provide nonvolatile storage of data, data structures, computer-executable instructions, and so forth. For the computer 502, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 512, including an operating system 530, one or more application programs 532, other program modules 534 and program data 536. It is appreciated that the present invention can be implemented with various commercially available operating systems or combinations of operating systems.

A user can enter commands and information into the computer 502 through a keyboard 538 and a pointing device, such as a mouse 540. Other input devices (not shown) may include a microphone, an IR remote control, a joystick, a game pad, a satellite dish, a scanner, or the like. These and other input devices are often connected to the processing unit 504 through a serial port interface 542 that is coupled to the system bus 508, but may be connected by other interfaces, such as a parallel port, a game port, a universal serial bus ("USB"), an IR interface, etc. A monitor 544 or other type of display device is also connected to the system bus 508 via an interface, such as a video adapter 546. In addition to the monitor 544, a computer typically includes other peripheral output devices (not shown), such as speakers, printers etc.

The computer 502 may operate in a networked environment using logical connections to one or more remote computers, such as a remote computer(s) 548. The remote computer(s) 548 may be a workstation, a server computer, a router, a personal computer, portable computer, microprocessor-based entertainment appliance, a peer device or other common network node, and typically includes many or all of the elements described relative to the computer 502, although, for purposes of brevity, only a memory storage device 550 is illustrated. The logical connections depicted include a LAN 552 and a WAN 554. Such networking environments are commonplace in offices, enterprise-wide computer networks, intranets and the Internet.

When used in a LAN networking environment, the computer 502 is connected to the local network 552 through a network interface or adapter 556. When used in a WAN networking environment, the computer 502 typically includes a modem 558, or is connected to a communications server on the LAN, or has other means for establishing communications over the WAN 554, such as the Internet. The modem 558, which may be internal or external, is connected to the system bus 508 via the serial port interface 542. In a networked environment, program modules depicted relative to the computer 502, or portions thereof, may be stored in the remote memory storage device 550. It will be appreciated that the network connections shown are exemplary and other means of establishing a communications link between the computers may be used.

Figure 6:
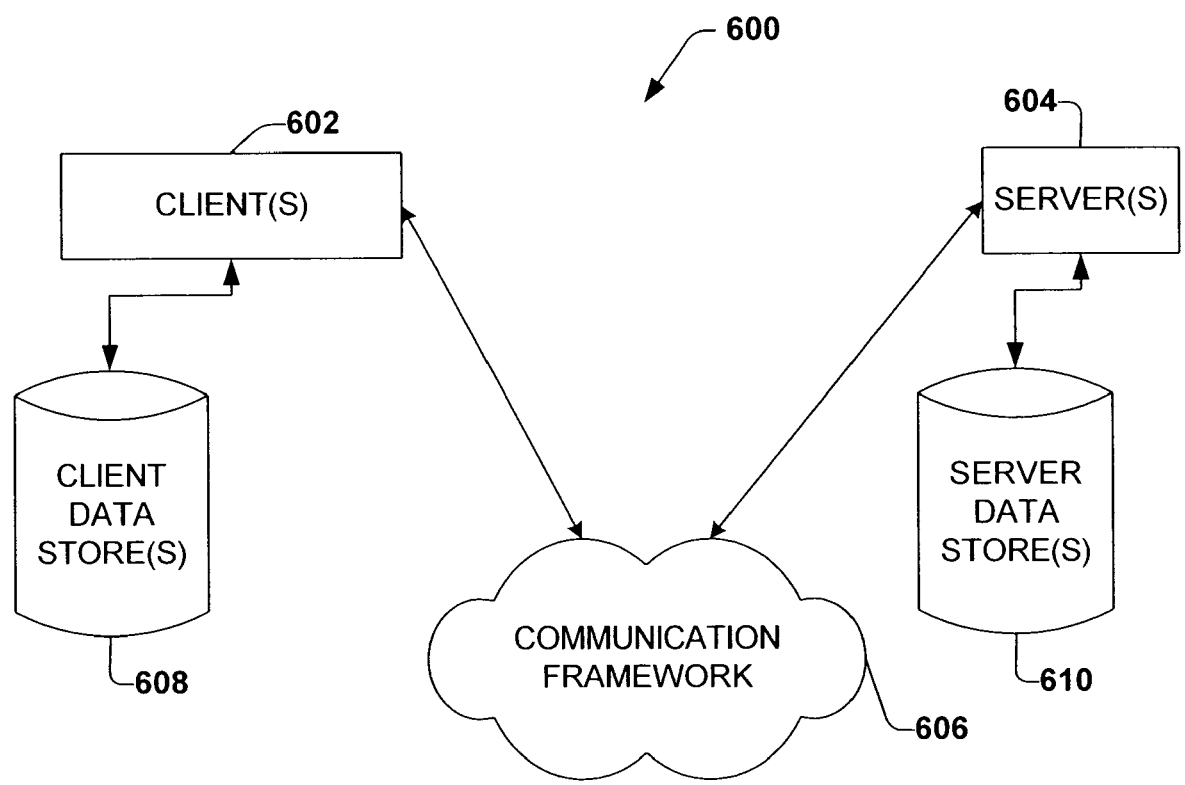
FIG. 6 illustrates a schematic block diagram of a networking environment in accordance with the present invention.

Referring now to FIG. 6, there is illustrated a schematic block diagram of a networking environment 600 in accordance with the present invention. The system 600 includes one or more client(s) 602. The client(s) 602 can be hardware and/or software (e.g., threads, processes, computing devices). The client(s) 602 can house cookie(s) and/or associated contextual information by employing the present invention, for example. The system 600 also includes one or more server(s) 604. The server(s) 604 can also be hardware and/or software (e.g., threads, processes, computing devices). The servers 604 can house threads to perform transformations by employing the present invention, for example. One possible communication between a client 602 and a server 604 may be in the form of a data packet adapted to be transmitted between two or more computer processes. The data packet may include a cookie and/or associated contextual information, for example. The system 600 includes a communication framework 606 that can be employed to facilitate communications between the client(s) 602 and the server(s) 604. The client(s) 602 are operably connected to one or more client data store(s) 608 that can be employed to store information local to the client(s) 602 (e.g., cookie(s) and/or associated contextual information). Similarly, the server(s) 604 are operably connected to one or more server data store(s) 610 that can be employed to store information local to the servers 604.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates asynchronous programming, comprising:
    at least one processor that executes the following computer executable components stored on at least one computer readable medium:
        a contract component that facilitates stating a behavioral contract defined according to an object oriented programming language on an asynchronous service interface between a client interface and a service interface;
        a conformance checking component that checks that the client interface and the service interface conform to the contract defined therebetween; and
        a model extraction component that automatically extracts, on an individual function level, a client model and a service model from the respective interfaces such that a model checking component may systematically explore all of the possible interactions between the client and the service.

2. The system of claim 1, the contract defines an order in which clients of the service interface are invoked.

3. The system of claim 2, the checking component checks that the clients handle both normal and exceptional results.

4. The system of claim 1, at wherein the asynchronous service interface and the contract are defined according to an objected oriented program language.

5. The system of claim 1, the checking by the checking component is modular wherein the contract is specified on an interface boundary of the client interface and the service interface and, each of the client interface and the service interface is checked independently, and each method is checked separately.

6. The system of claim 1, the checking component further comprises a model extraction component that automatically extracts a behavior model that is fed to a model checker component.

7. The system of claim 6, the extracted model is sound in the presence of aliasing.

8. The system of claim 1, further comprising a construct in the form of an asynchronous call that returns a future-like handle to an eventual result of the call.

9. The system of claim 1, further comprising a construct in the form of a synch statement.

10. The system of claim 1, further comprising a construct that states the behavioral contract on the service interface.

11. The system of claim 1, further comprising a construct that is a transaction directive that delineates the scope of conversations by clients.

12. The system of claim 1, further comprising a construct that is a tracked type qualifier used by the checking component.

13. The system of claim 1, further comprising a procedure, which procedure is a method that is called at least one of synchronously and asynchronously.

14. The system of claim 13, the asynchronous call executes concurrently with its caller by completing immediately, while the method that is invoked executes.

15. The system of claim 14, the asynchronous call completes by returning a value.

16. The system of claim 15, the value is used explicitly to synchronize the asynchronous call with the value.

17. The system of claim 15, the value is a first-class type that can be at least one of stored, passed as an argument, and returned as a result.

18. The system of claim 17, the result returned is explicitly retrieved through a join statement.

19. The system of claim 15, the value is an object in one of three states that include an undefined state, normal state, and exceptional state.

20. The system of claim 1, the contract is a source-level contract that facilitates statically detecting asynchronous message passing errors.

21. The system of claim 1, the contract expresses stateful protocols that govern interactions between a client associated with the client interface and a service associated with the service interface.

22. The system of claim 1, the service interface is associated with a service contract whose language models the effects of multiple clients that concurrently access the service interface.

23. The system of claim 1, the checking component checks that services and clients obey the contract associated with the service interface.

24. The system of claim 1, the checking component uses a transaction directive to delimit a scope of an instance of a concurrent interaction between a client and a set of service instances.

25. The system of claim 24, the transaction directive specifies a correlation variable that uniquely identifies the instance of the concurrent interaction between the client and the set of service instances.

26. The system of claim 1, the checking component is modular in that to check for the client conformance and the service conformance, only the associated contract needs to be referenced.

27. The system of claim 1, the checking component considers a method as a function of an object to which it belongs.

28. The system of claim 1, the checking component relates a contract state, a client state, and a service state.

29. The system of claim 28, the checking component further comprises an extraction component that extracts a client model, service model, and interface model in order to relate the contract state, client state, and service state.

30. The system of claim 28, the checking component further comprises an extraction component that uses a region to model relevant data, which relevant data is that data which is directly relevant to the contract state.

31. The system of claim 30, the region is polymorphic.

32. The system of claim 30, the region is partial such that only relevant data is directly assigned to a region type.

33. The system of claim 1, the checking component further comprises an extraction component that facilitates model reduction by utilizing only necessary statements.

34. The system of claim 1, the checking component further comprises an extraction component that utilizes region-and-effect analysis to extract a model.

35. The system of claim 1, the checking component further comprises an extraction component that utilizes type-and-effect inference and source-level tracked types.

36. The system of claim 1, the contract is programmer-specified to separately check client and server code.

37. A computer according to the system of claim 1.

38. A system that facilitates asynchronous programming, comprising:
at least one processor that executes the following computer executable components stored on at least one computer readable medium:
an extraction component that automatically extracts a client model from a client interface and a service model from a service interface on an individual function level, such that a model checking component may systematically explore all of the possible interactions between the client and the service;
a relator component that creates a behavioral contract defined according to an object oriented programming language between the client model and the service model; and
a conformance checking component that checks that the client interface obeys the behavioral contract, and the service interface properly implements the behavioral contract.

39. The system of claim 38, the behavioral contract expressed in terms of at least one of a future, a join on the future, and asynchronous function calls.

40. The system of claim 38, the conformance checking component checks that clients of the client interface are invoked in the proper order and that the clients handle both normal and exceptional results.

41. The system of claim 38, the extraction component creates the client model that defines relevant data for interaction with the service interface.

42. The system of claim 38, the extraction component creates the service model that defines relevant data for interaction with the client interface.

43. The system of claim 38, the relator component checks the client model and the service model such that contract descriptions of the behavioral contract are defined between the client model and the service model.

44. A method of asynchronous programming, comprising:
employing a processor to execute computer readable instructions stored on a computer readable medium to perform the following acts:
receiving a client interface and a service interface;
creating a behavioral contract defined according to an object oriented programming language between the client interface and the service interface;
checking to ensure that the client interface obeys the behavioral contract and the service interface properly implements the behavioral contract; and
automatically extracting via a model extraction component, on an individual function level, a client model and a service model from the respective interfaces such that a model checking component may systematically explore all of the possible interactions between the client and the service.

45. The method of claim 44, the behavioral contract is expressed in terms of at least one of a future, a join on the future, and asynchronous function calls.

46. The method of claim 44, the behavioral relationship is a contract the terms of which are enforced by a modular checking component.

47. The method of claim 46, the modular checking component checks that clients of the client interface are invoked in the proper order and that the clients handle both normal and exceptional results.

48. The method of claim 44, the model extraction component creating the client model that defines relevant data for interaction with the service interface.

49. The method of claim 44, the model extraction component creates the service model that defines relevant data for interaction with the client interface.

50. The method of claim 44, further comprising performing model checking of the client model and the service model with a model checker such that contract descriptions are defined between the client model and the service model.

51. The method of claim 44, further comprising automatically extracting the behavioral contract.

52. A method of asynchronous programming, comprising:
employing a processor to execute computer readable instructions stored on a computer readable medium to perform the following acts:
receiving a client interface and a service interface;
automatically extracting a client model from the client interface and a service model from the service interface on an individual function level, such that a model checking component may systematically explore all of the possible interactions between the client and the service;
creating a behavioral contract defined according to an object oriented programming language between the client model and the service model; and
enforcing the behavioral contract between the client interface and the service interface.

53. The method of claim 52, the behavioral contract comprises a contract expressed by constructs in terms of at least one of a future, a join on the future, and asynchronous function calls, and the terms of which are enforced by a modular checking component.

54. The method of claim 52, further comprising checking that clients of the client interface are invoked in the proper order and that the clients handle both normal and exceptional results.

55. The method of claim 52, wherein the client model defines relevant data for interaction with the service interface for the client interface, and the service model defines relevant data for interaction with the client interface.

56. An article of manufacture tangibly embodying program instructions for execution by a processing unit, the processing unit retrieving the instructions from a computer-readable memory to facilitate concurrent execution of the instructions, the product comprising:
  a contract component that creates a contract state defined according to an object oriented programming language between a client state and a service state;
  an extraction component that automatically extracts a client model from the client state, a service model from the service state, and an interface model from the contract state on an individual function level, such that a conformance checking component may systematically explore all of the possible interactions between the client and the service;
  and the conformance checking component checks that the client model obeys the interface model, and the service model properly implements the contract model.

57. The article of claim 56, the client model, service model, and interface model contain only respective communication actions and operations that are relevant for maintaining the state of a communication protocol.

58. The article of claim 57, the relevant operations are represented by the use of regions.

59. The article of claim 56, the interface model includes one or more effect processes for each method of the interface state.

60. The article of claim 59, the effect process models a method of the interface state according to an effect a call has on the contract state, a future created by an asynchronous call to the method, and futures passed into the method.

61. A system of asynchronous programming, comprising one or more computing devices configured with:
  means for receiving a client interface and a service interface;
  means for automatically extracting a client model from the client interface and a service model from the service interface on an individual function level, such that a means for checking may systematically explore all of the possible interactions between the client and the service;
  means for creating a behavioral contract defined according to an object oriented programming language between the client model and the service model; and
  the means for checking to ensure that the client interface obeys the behavioral contract and the service interface properly implements the behavioral contract.

62. The system of claim 18, the first class type is introduced by one of a local declaration or a field member declaration.

* * * * *